US009395025B2

(12) United States Patent
Ireland et al.

(10) Patent No.: US 9,395,025 B2
(45) Date of Patent: Jul. 19, 2016

(54) PIPE JOINT RESTRAINT SYSTEMS

(76) Inventors: Don Ireland, Las Vegas, NV (US); Jack R. Laney, Clearwater, FL (US)

( * ) Notice: Subject to any disclaimer, the term of this patent is extended or adjusted under 35 U.S.C. 154(b) by 0 days.

(21) Appl. No.: 13/178,702

(22) Filed: Jul. 8, 2011

(65) Prior Publication Data

US 2012/0005866 A1 Jan. 12, 2012

Related U.S. Application Data

(60) Provisional application No. 61/362,755, filed on Jul. 9, 2010.

(51) Int. Cl.
*F16L 21/00* (2006.01)
*E03C 1/12* (2006.01)
*E03F 3/04* (2006.01)
*F16L 21/08* (2006.01)

(52) U.S. Cl.
CPC .............. *F16L 21/005* (2013.01); *E03C 1/12* (2013.01); *E03F 3/04* (2013.01); *F16L 21/08* (2013.01); *Y10T 24/14* (2015.01); *Y10T 24/1439* (2015.01); *Y10T 24/1457* (2015.01); *Y10T 137/0402* (2015.04)

(58) Field of Classification Search
USPC ......... 285/236, 252, 253, 254, 407, 420, 367, 285/417, 410, 411
See application file for complete search history.

(56) References Cited

U.S. PATENT DOCUMENTS

| 968,506 | A | * | 8/1910 | Blaha | F16L 21/002 |
| | | | | | 285/420 |
| 1,539,001 | A | * | 5/1925 | Steeple | F16L 33/04 |
| | | | | | 285/259 |
| 1,891,874 | A | * | 12/1932 | Elkins | 403/378 |
| 2,395,745 | A | * | 2/1946 | King | F16L 21/005 |
| | | | | | 285/420 |
| 2,403,606 | A | * | 7/1946 | Gerhard | F16L 33/04 |
| | | | | | 285/367 |
| 2,958,549 | A | * | 11/1960 | Spafford | F16L 33/08 |
| | | | | | 285/420 |
| 2,963,305 | A | * | 12/1960 | Miller | F16L 33/04 |
| | | | | | 285/420 |
| 3,233,922 | A | * | 2/1966 | Gordon | F16L 21/005 |
| | | | | | 285/367 |
| 3,252,192 | A | * | 5/1966 | Smith | F16L 1/10 |
| 3,565,468 | A | * | 2/1971 | Garrett | 285/373 |
| 4,093,282 | A | * | 6/1978 | Kyriakodis | 285/114 |
| 4,155,574 | A | | 5/1979 | Hulsey | |
| 4,492,393 | A | | 1/1985 | Schaub | |
| 4,889,167 | A | | 12/1989 | Morris | |
| 5,368,337 | A | * | 11/1994 | Torres | F16L 33/08 |
| | | | | | 285/318 |
| 5,431,458 | A | | 7/1995 | Schaub et al. | |
| 5,741,029 | A | * | 4/1998 | Wilson | F16L 25/14 |
| | | | | | 285/417 |
| 6,065,782 | A | * | 5/2000 | Allen, Jr. | F16L 41/021 |
| | | | | | 285/420 |
| 6,139,068 | A | * | 10/2000 | Burress | 285/92 |
| 6,145,896 | A | | 11/2000 | Vitel et al. | |

(Continued)

*Primary Examiner* — David E Bochna
(74) *Attorney, Agent, or Firm* — RG Patent Consulting, LLC; Rachel Gilboy

(57) ABSTRACT

System is a pipe joint restraint for restraining two coupled pipe ends or a pipe end and at least one fitting. The system is used in conjunction with a hubless coupling designed for drainage and sewer pipes of no pressure or low pressure. At least two adjustable circumferential bands with an abrasive grit material adhesively attached to the interior contact portion of the bands are situated one on each side of the hubless coupling; and are fixedly joined by a plurality of spread restrictor braces. The spread restrictor braces contain 45-degree upward bends to create a space between the adjustable circumferential bands and the pipe for the coupling, which serve to prevent separation of the pipe connection under pressure conditions. The pipe joint restraint assembly may be tightened by a fastener assembly containing fully threaded bolts, a barrel nut, and a trunnion.

2 Claims, 6 Drawing Sheets

(56) References Cited

U.S. PATENT DOCUMENTS

| | | | |
|---|---|---|---|
| 6,594,869 B1 * | 7/2003 | Chen | F16L 33/04 285/410 |
| 8,187,025 B2 * | 5/2012 | Luzzi | H01R 13/639 439/369 |
| D683,319 S * | 5/2013 | Luzzi | D13/156 |

* cited by examiner

PIPE JOINT RESTRAINT SYSTEMS

CROSS-REFERENCE TO RELATED APPLICATION

The present application is related to and claims priority from prior provisional application Ser. No. 61/362,755, filed Jul. 9, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of piping connections, and more specifically relates to pipe joint restraint restraining means when compression type couplings are utilized to join plain end pipe and or fittings in end to end applications.

DESCRIPTION OF THE RELATED ART

Today's conventional storm and waste water systems within building structures may contain miles of cast iron piping with countless joints, turns and branch connections. These systems may be connected with compression type hubless couplings as the Cast Iron Soil Pipe Institute estimates, since 1961, more than one and a half billion no-hub couplings have been installed in North America alone. Many of these couplings require some form of restraint to prevent possible separation when subjected to pressures or the surges of pressure that may occur once placed into service. While the compression type coupling has played an important role in reducing labor and material cost and eliminated the safety concern associated with the molten lead Bell and Spigot joint system it brings with it the need for additional restraining measures. Most manufacturers of these hubless couplings along with the Cast Iron Soil Pipe Institute recommend joint restraint at changes in direction and or branch connections for certain pipe sizes when utilizing no-hub compression type couplings. City, State and federal regulations often dictate the design requirements and codes that utility systems and building construction must adhere to for the well-being of the general public. Additionally, design engineers may require restraint of hubless coupling joints where there are turns or branch connections of concern within the system.

Above ground and below ground waste and storm water piping systems are typically built with short segments of ductile iron, cast iron, steel, and PVC piping, as well as potentially being made of several other pipe materials. Each segment (joint) of pipe may be connected to another with some sort of coupling system (hubless or other.) The piping system(s) may make many directional changes within a relatively short distance and wherever a directional change takes place, an "elbow" is used. An elbow (pipefitting) may angle the flow of water by 22½ degrees, 45 degrees, or up to 90 degrees, to get it to its destination. Additionally, at some points in the system, the piping may include branch connections utilizing Tee or Wye fittings. These various configurations add additional resistance to interior flows and may be difficult to couple and suitably restrain using conventional methods.

Static and dynamic pressures within the storm water or wastewater system may act to separate the joints of pipe and fittings used within the system (hubless or other) and necessitate that measures be taken to restrain the pipe(s)/joints from movement and/or separation. These pressures within the system can greatly multiply over what static pressure is during code required testing conditions. Pressure and surges of pressure may become present with heavy rain fall, line blockages, heavy use or a combination of any of these events. The stresses placed on the joints with these changes in direction and or branch connections, when subjected to these conditions, can be far greater than those experienced during code testing or normal service. At locations where straight joints of pipe are connected, where elbows are used, or where there is a branch connection, some sort of pipe-joint restraint system may be required. A pipe joint restraint can be merely underground burial for straight pipe connections, or concrete thrust blocks (kickers) at elbows on larger pipe sizes below grade. Above and below ground, a mechanical joint restraint may be used where the highest stresses occur to avoid de-coupling and joint separation.

Within buildings where pipe is often supported aerially with brackets and hangers, each connection may need to be restrained. These pipe connections may be made with No-Hub® couplings that have a thin metal sleeve with a rubber gasket and have a series of hose-type clamps that tighten over the circumference of the pipe(s). By themselves, while doing an excellent job of preventing leakage under normal conditions, these clamps inherently have little positive built in restraint capability. Codes dictate that drainage pipes systems withstand only 4.3 psi, when tested during construction, regardless of the pipes diameter or location. This leaves cast iron joints/systems subject to failure and/or separation at very low additional pressures or surges, which can result in flooding and potentially catastrophic damages to the structure and its contents. The Cast Iron Soil Pipe Institute, coupling manufacturers, design engineers and construction practices often recommend if not require that restraint systems be installed even if testing is passed at the code required pressure. Installation contractors are often left to fabricate their own untested restraint systems using linear rods and clamps attached to each pipe segment or elbow. The concoctions often devised for restraint systems, however, may be weak, untested, and may therefore expose structures to system failures due to joint separation. The time spent in fabrication is also costly and inconvenient and often does not provide a positive restraint for the piping system in the event of a pressure surge. Thus, what is needed is a reliable, convenient and effective pipe gripping and fastening system that is both low in cost and high in performance.

Various attempts have been made to solve the above-mentioned problems such as those found in U.S. Pat. Nos. 3,565, 468; 6,145,896; 5,431,458; 4,492,393; 4,155,574; and 4,889, 167. This prior art is representative of compression type hubless pipe coupling systems. None of the above inventions and patents, taken either singly or in combination, is seen to describe the invention as claimed.

Ideally, a hubless pipe coupling restraining system should provide a convenient and positive pipe joint restraint and, yet would operate reliably and be manufactured at a modest expense while reducing restraint labor cost. Thus, a need exists for a reliable hubless pipe coupling system to restrain pipe joints and to avoid the above-mentioned problems while requiring no special tools and allowing alteration and repairs to be easily performed during service and installation.

BRIEF SUMMARY OF THE INVENTION

In view of the foregoing disadvantages inherent in the known pipe coupling art, the present invention provides a novel hubless pipe coupling joint restraint system. The general purpose of the present invention, which will be described subsequently in greater detail is to provide affordability and positive grip pipe joint restraint.

Disclosed is a pipe joint restraint system that effectively prevents the separation of pipes and fittings when subjected to surges of pressures to an extent far greater than those applied during code testing. The present invention, pipe joint restraint systems is designed to be placed over hubless compression type (No-hub® or the like) couplings that are utilized in joining cast iron pipes and fittings and is ideal for use by plumbing trades in today's mechanical construction installations of cast iron sanitary sewer and storm water systems.

The pipe joint restraint system preferably comprises at least two adjustable circumferential bands, each having a first end and a second end, a plurality of spread-restrictor-braces, and a plurality of adjustable fastener assemblies. The adjustable circumferential bands are located substantially in a parallel relation to each other and preferably have looped ends with a threaded barrel-nut inserted on one end and the other looped end contains a capped trunnion with a bolt passageway such that the looped ends may be adjustably coupled via a threaded tap bolt and the threaded barrel-nut. The plurality of spread-restrictor-braces are mounted equally about the circumference of the adjustable circumferential bands such that the adjustable circumferential bands and the spread-restrictor-braces are oriented perpendicularly to each other and held as such. A constant equi-distant relationship between the adjustable circumferential bands and between the spread-restrictor-braces is maintained by fastening means (such as eyelets or other suitable equivalent) that fixedly attach the assembly together.

In some embodiments the spread-restrictor-braces may be non-fixedly attached to the adjustable circumferential bands via at least one biaser. The spread-restrictor-braces each preferably comprises two about 45 degree bends to create an offset passage thereby providing a distance between the spread-restrictor-braces and the pipe connections to allow the pipe joint restraint assembly to pass over an existing hubless (No-hub® or the like) coupling. The first end and the second end of the adjustable circumferential bands are removably attached together via adjustable fastener assemblies comprising tap bolts (the tap bolts having threads along an entire length of the bolt shank). The adjustable fastener assemblies preferably comprising a trunnion to threaded barrel nut hardware assembly with a tap bolt passing through the trunnion for tightening. The adjustable circumferential bands may have an 'inner grip' surface of suspended grit that frictionally-grips the interior of the adjustable circumferential bands and the pipe's exterior surface. The adjustable circumferential bands, spread-restrictor-braces, and adjustable fastener assemblies comprise a pipe joint restraint made of 300 series stainless steel for corrosion resistance and are usable to tighten about and safely and reliably frictionally restrain two pipe connections together in a coupled relationship.

The present invention holds significant improvements and serves as a pipe joint restraint system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pipe joint restraint system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a pipe joint restraint system and more particularly to a hubless coupling restraint system as used to improve joint reliability and reduce costs during installation and in-use.

Figure 1:
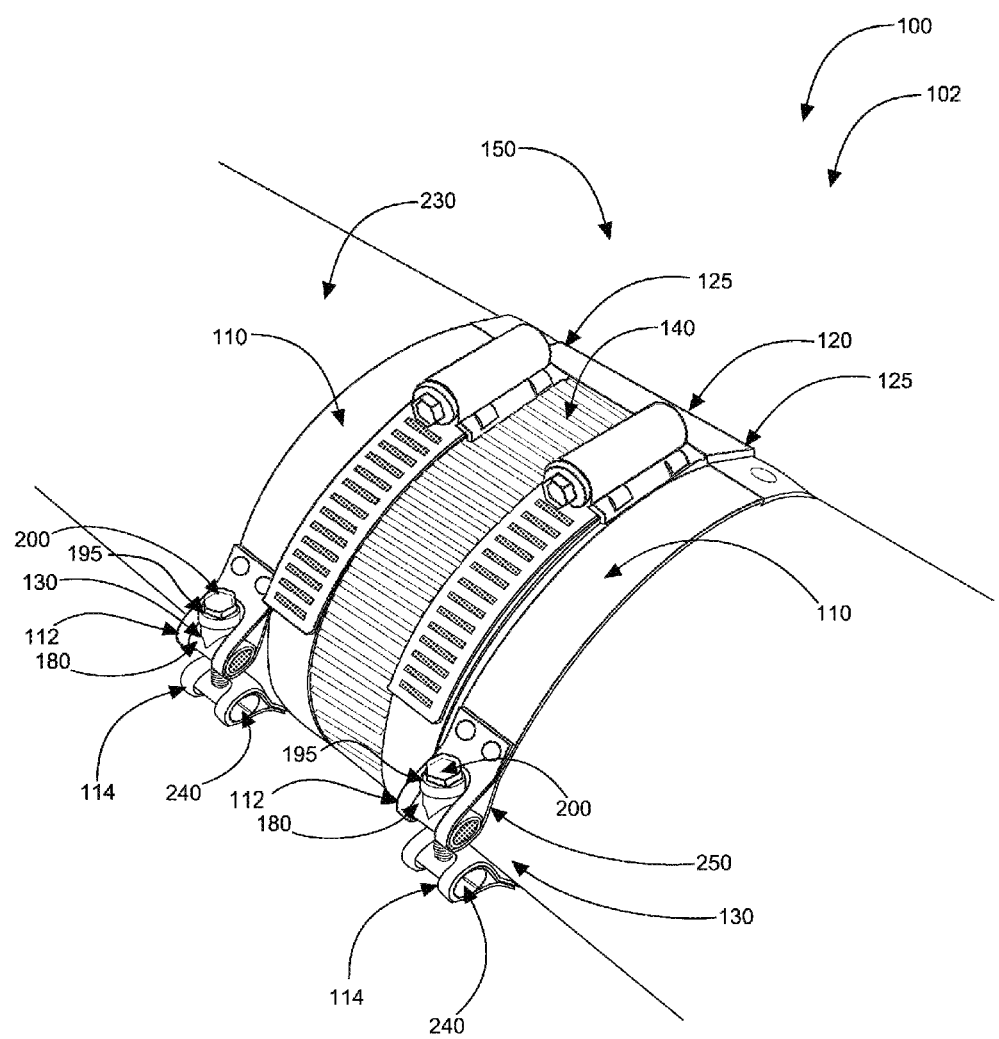
FIG. 1 shows a perspective view illustrating an in-use condition of the pipe joint restraint system (as placed over a hubless coupling to restrain two pipe joints (ends) adjacently) according to an embodiment of the present invention.

Referring to the drawings by numerals of reference there is shown in FIG. 1, a perspective view illustrating an in-use condition of pipe joint restraint system 100 according to an embodiment of the present invention. Pipe joint restraint system 100 is designed to effectively ensure a strong coupling between pipes and fittings (despite that they may incur considerable pressure and or surges of pressure) and may comprise at least two adjustable circumferential bands 110, each of adjustable circumferential bands 110 having first end 112 and second end 114, a plurality of spread-restrictor-braces 120, and a plurality of adjustable fastener assemblies 130.

Figure 2:
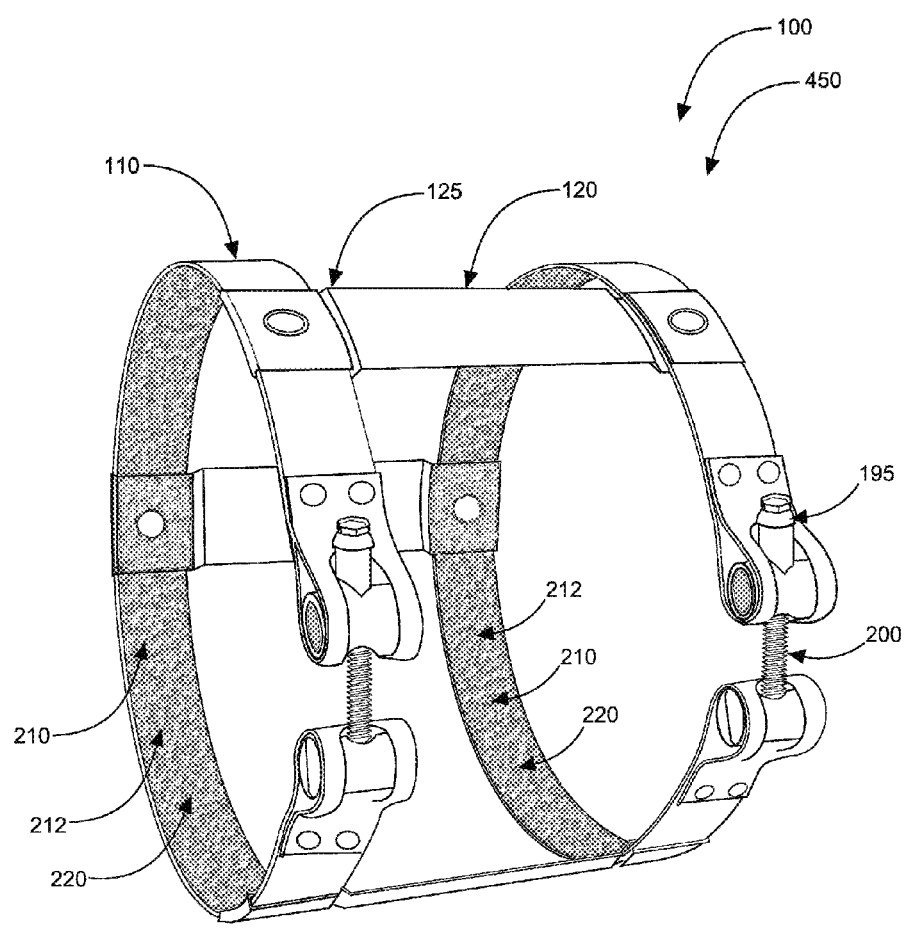
FIG. 2 is a perspective view illustrating the pipe joint restraint system according to an embodiment of the present invention of FIG. 1.

Pipe joint restraint system 100 is designed to be placed around the outside diameter of the fitted pipes and joints, with one adjustable circumferential band 110 located on each side of hubless coupling 140. Adjustable circumferential bands 110 are preferably located in parallel relation to each other and the plurality of spread-restrictor-braces 120 are located in parallel relation to each other. Spread-restrictor-braces 120 are mounted (substantially equally) about a circumference of adjustable circumferential bands 110 such that adjustable circumferential bands 110 and spread-restrictor-braces 120 are oriented perpendicularly to each other, as shown in FIG. 2 for example. Spread-restrictor-braces 120 define and maintain a constant equi-distant relationship between adjustable circumferential bands 110. First end 112 and second end 114 may be spot welded to adjustable circumferential bands 110 are removably attached together via adjustable fastener assemblies 130. Adjustable circumferential bands 110, spread-restrictor-braces 120, and adjustable fastener assemblies 130 comprise pipe joint restraint assembly 102 that is installable over an existing hubless coupling 140. In this way the present invention may provide suitable and convenient pipe restraint.

Referring now to FIG. 2, a perspective view illustrating pipe joint restraint system 100 according to an embodiment of the present invention of FIG. 1. A further benefit is that pipe joint restraint system 100 is able to hold pipe connections 150 together in a coupled relationship such that an insulation vapor barrier is not compromised (if present). This is made possible because the present system is applied over and around the installation not via bent rod and brace contortions. Pipe joint restraint system 100 preferably comprises 300 series stainless steel and is resistant to corrosion such that it may be installed in wet conditions or that it may withstand corrosive conditions when buried in soil. Spread-restrictor-braces 120 preferably comprise two about 45 degree bends 125 one on each end such that each spread-restrictor-brace(s) 120 contains two about 45 degree bends 125 to create an offset passage providing a distance between spread-restrictor-braces 120 and pipe connections 150 allowing pipe joint restraint assembly 102 to pass over an existing hubless coupling 140 (as shown in FIG. 1). Spread-restrictor-braces 120 are fixedly attached to adjustable circumferential bands 110 via eyelets 160 (or other suitable means) for proper positioning and to prevent spreading apart of pipe connections 150.

Figure 3:
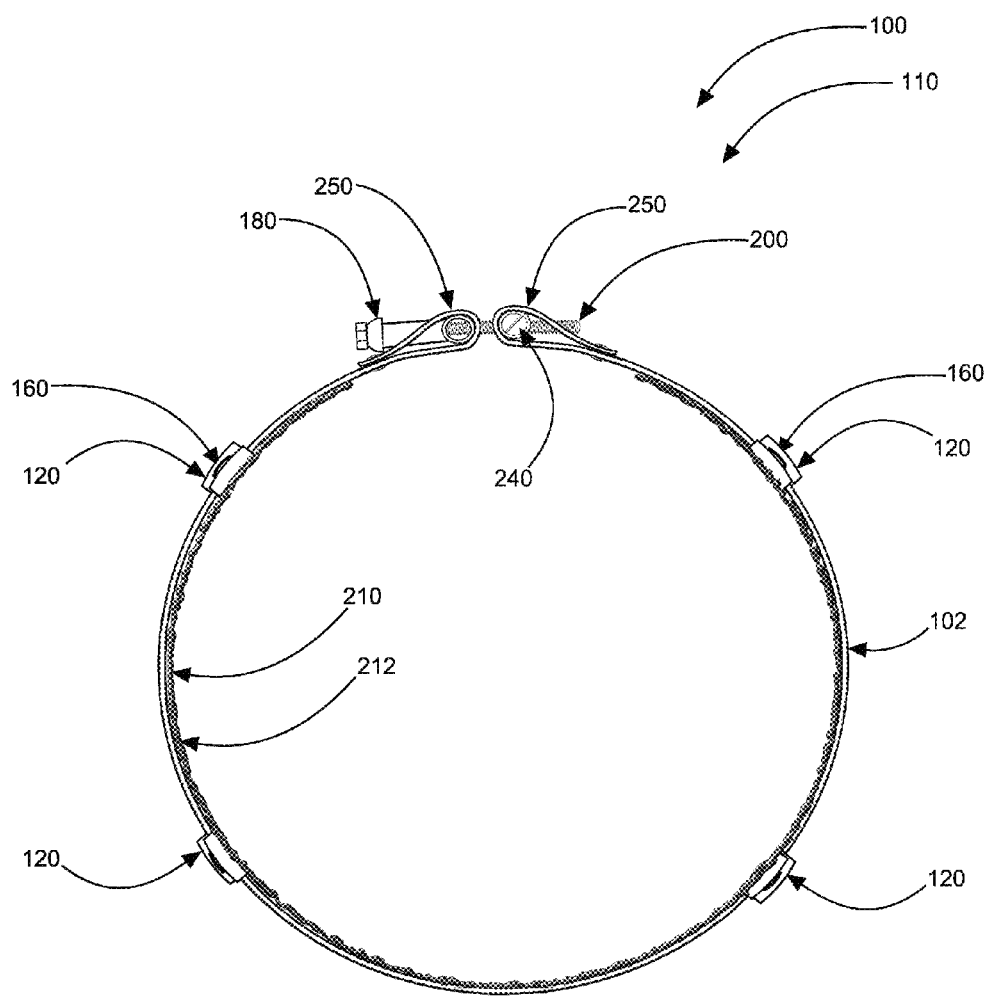
FIG. 3 is a perspective view illustrating end view of the pipe joint restraint system according to an embodiment of the present invention of FIG. 1.

Referring now to FIG. 3, a perspective view illustrating an end view of pipe joint restraint system 100 according to an embodiment of the present invention of FIG. 1. Spread-restrictor-braces 120 may be non-fixedly attached to adjustable circumferential bands 110 via at least one biaser in some embodiments, or may preferably be fixedly attached to reduce the labor of installation. Two to five spread-restrictor-braces 120 preferably made of 24-gauge stainless steel sheet metal, can run between the adjustable circumferential bands 110 and may cross over hubless coupling 140 used to join pipe-to-pipe and pipe-to-fitting cast iron components. Trunnion assembly 180 of adjustable fastener assemblies 130 may contain cap 195 to reduce rotational friction between the trunnion assembly 180 and tap bolt 200 during tightening.

Figure 4:
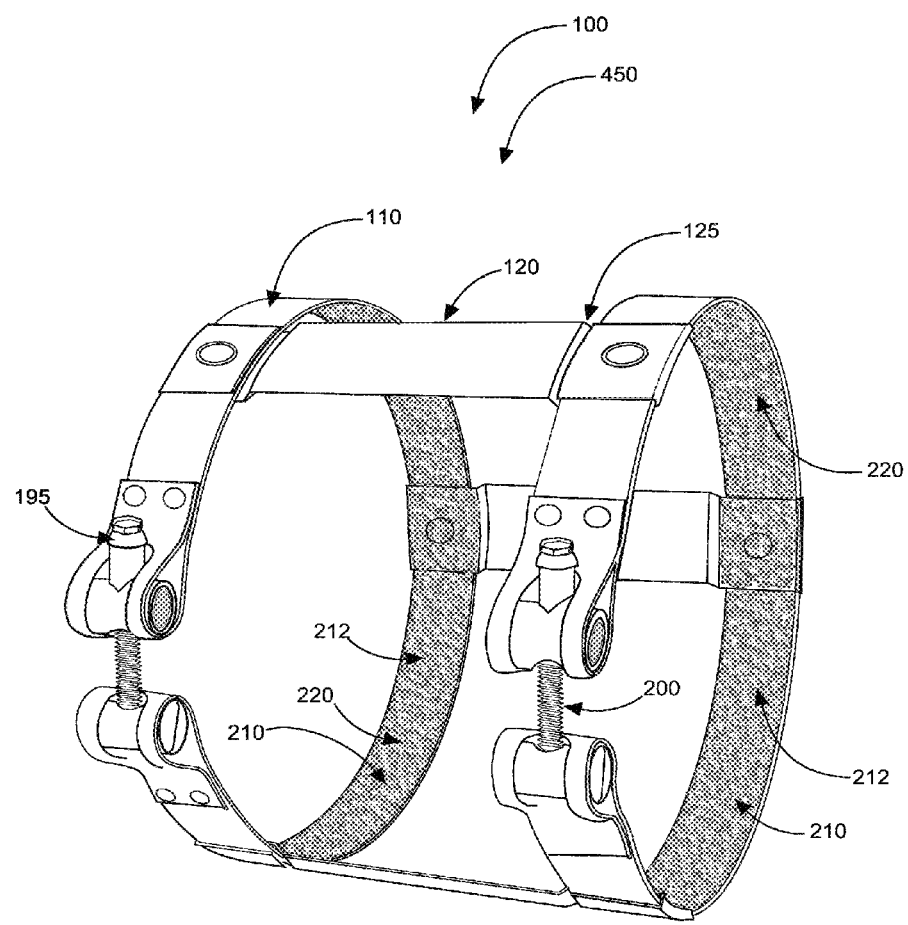
FIG. 4 is another perspective view illustrating an interior grip surface of the adjustable circumferential bands according to an embodiment of the present invention of FIGS. 1-3.

Referring now to FIG. 4, a perspective view illustrating interior grip surface 210 of adjustable circumferential bands 110 according to an embodiment of the present invention of FIGS. 1-3. Adjustable circumferential bands 110 comprise interior grip surface 210 allowing pipe joint restraint assembly 102, when tightened, to frictionally restrain two pipe connections 150 together in a coupled relationship. Interior grip surface 210 may comprise suspended grit material 220 (sand or other suitable grit may be added before, during or after spray application of medium, or may be integral to the mixture) creating a gripping means between inner contact surface 212 of adjustable circumferential bands 110 and outer circumferential surface 230 of pipe connection(s) 150 when adjustable fastener assemblies 130 is tightened to a manufacturer specified torque setting. Building code test pressures (requirements) of 4.3 psi for hubless pipe installations may at times be far exceeded requiring a properly installed pipe joint restraint system 100 using the present invention as specified by the method of use 500, as shown in FIG. 6.

Figure 5:
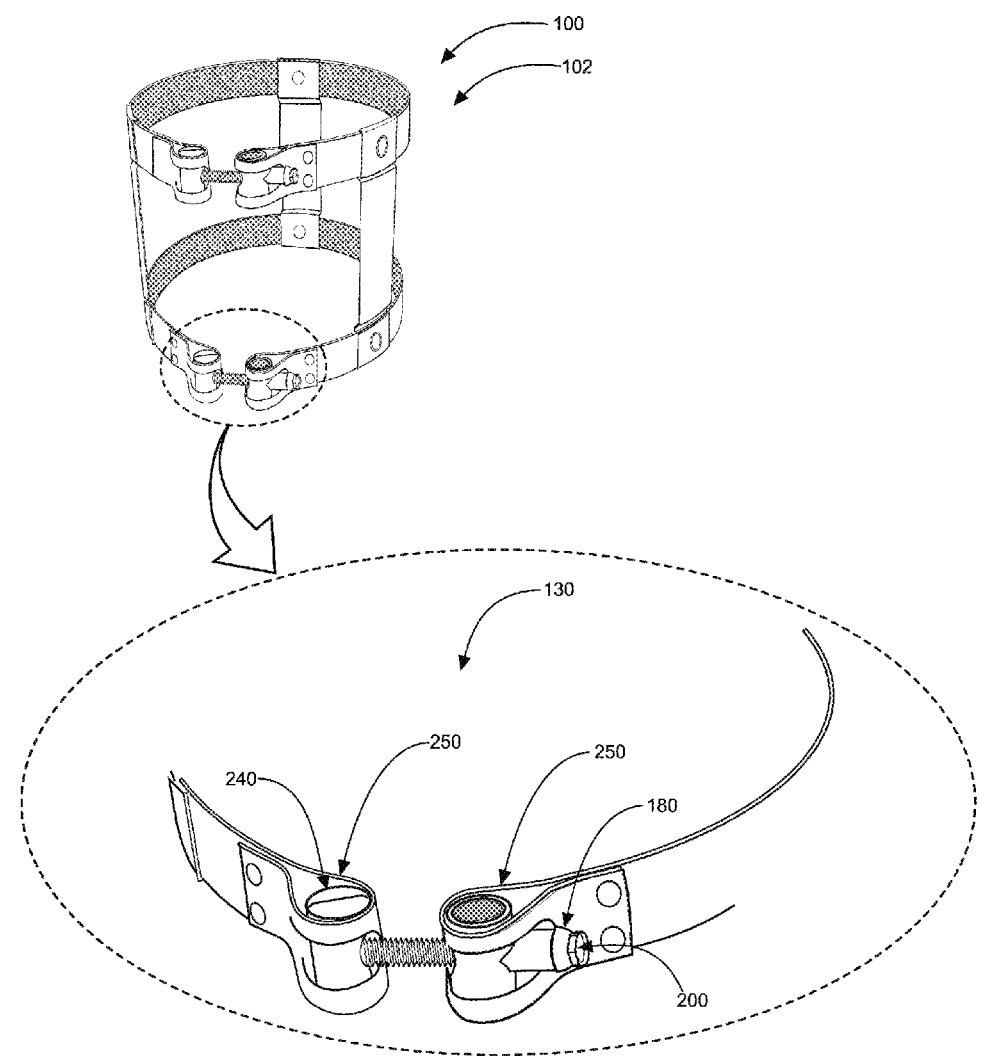
FIG. 5 is a close-up view illustrating the fastener assembly (trunnion with tap bolt to threaded barrel nut) for a pipe joint restraint system according to an embodiment of the present invention of FIG. 1.

Referring now to FIG. 5, a close-up view illustrating adjustable fastener assemblies 130 for pipe joint restraint system 100 according to an embodiment of the present invention of FIG. 1. Adjustable circumferential bands 110 may each contain adjustable fastener assemblies 130 that are torquable to a tension of about 60 inch lbs via a 5/16" bolt head for pipe sizes 1½" through 4". Torque can be up to 80 inch lbs of tension via a 3/8" bolt head for pipe sizes 5" through 15". First end 112 and second end 114 of adjustable circumferential bands 110 each preferably have looped ends with a bolt passageway oriented so that adjustable fastener assemblies 130 may be used to pull looped ends 250 toward each other when adjustable fastener assemblies 130 is tightened, thereby reducing inside diameter of pipe joint restraint system 100. In preferred embodiments, adjustable fastener assemblies 130 contain threaded barrel nut 240 within one looped end 250 which is aligned with the bolt passageway in looped end 250 so that tap bolts 200 can be threadedly received, after passing through trunnion assembly 180 within the opposing looped end 250. Tap bolts 200 may contain threads along an entire length of shank to provide maximum tightening adjustability.

Pipe joint restraint system 100 may be sold as kit 450 comprising the following parts: at least one pipe joint restraint system 100 for a user preferred pipe diameter; at least two adjustable fastener assemblies 130; and at least one set of user instructions. Pipe joint restraint system 100 may be manufactured and provided for sale in a wide variety of sizes and shapes for a wide assortment of plumbing and restraining applications with a variety of pipes. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different pipe-fitting combinations, parts may be sold separately, etc., may be sufficient.

Figure 6:
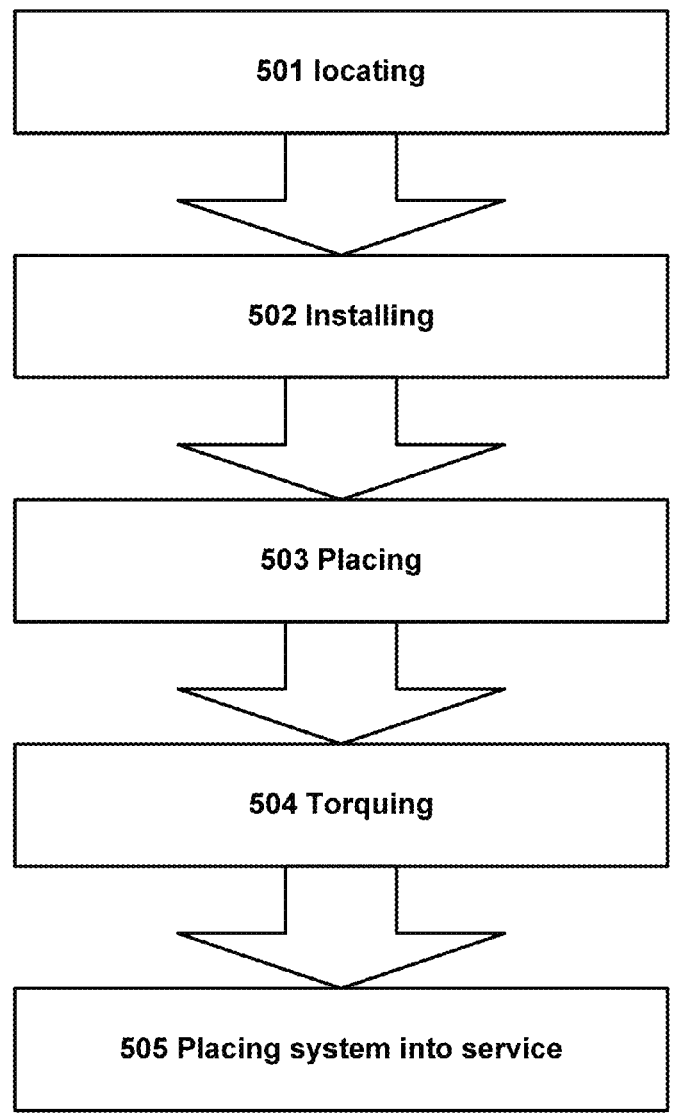
FIG. 6 is a flowchart illustrating a method of use for a pipe joint restraint system according to an embodiment of the present invention of FIGS. 1-5.

Referring now to FIG. 6, showing a flowchart illustrating a method of use 500 for pipe joint restraint system 100. A method of using (method of use 500) pipe joint restraint system 100 may comprise the steps of: step one 501 locating two pipe ends adjacent to each other; step two 502 installing hubless coupling 140 over the two pipe ends (and tightening) creating a coupled relationship; step three 503 placing pipe joint restraint system 100 over hubless coupling 140; step four 504 torquing pipe joint restraint system 100 to a manufacturer defined torque setting thereby sufficiently restraining two pipe ends and; and step five 505 placing system into service (after suitable testing has occurred.)

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pipe joint restraint system comprising:
    a) at least two adjustable circumferential bands, each of said adjustable circumferential bands having a first end and a second end and an inner grip surface;
    b) a plurality of spread-restrictor-braces; and
    c) a plurality of adjustable fastener assemblies;
    d) wherein said adjustable circumferential bands are located in parallel relation to each other;
    e) wherein said first end and said second end of said adjustable circumferential bands each have looped ends;
    f) wherein said looped ends comprise a bolt passageway;
    g) wherein said plurality of said spread-restrictor-braces are located in parallel relation to each other;
    h) wherein said spread-restrictor-braces are mounted about a circumference of said adjustable circumferential bands such that said adjustable circumferential bands and said spread-restrictor-braces are oriented perpendicularly to each other;
    i) wherein said spread-restrictor-braces define and maintain a constant equi-distant relationship between said adjustable circumferential bands;
    j) wherein said spread-restrictor-braces comprise two about 45 degree bends to create an offset passage;
    k) wherein said spread-restrictor-braces are fixedly attached to said adjustable circumferential bands via an eyelet;
    l) wherein said offset passage provides a distance between said spread-restrictor braces and said pipe connections to allow said pipe joint restraint assembly to pass over an existing hubless coupling;
    m) wherein said first end and said second end of said adjustable circumferential bands are removably attached together via said adjustable fastener assemblies;
    n) wherein said adjustable fastener assemblies comprise tap bolts having threads along an entire length of a shank of said tap bolts;
    o) wherein said adjustable fastener assemblies comprise a trunnion to barrel hardware assembly;
    p) wherein said trunnion to barrel hardware assembly comprises a trunnion, tap bolt and receiving threaded barrel-nut;
    q) wherein said inner grip surface comprises a grit material suspended in a medium;
    r) wherein said pipe joint restraint system comprises 300 series stainless steel; and
    s) wherein said pipe joint restraint assembly is usable to tighten about and frictionally restrain a pipe connection together in a coupled relationship.

2. The pipe joint restraint system of claim 1 wherein said pipe joint restraint system is able to hold said pipe connections together in a coupled relationship such that an insulation vapor barrier is not compromised.

* * * * *